Figure 1:
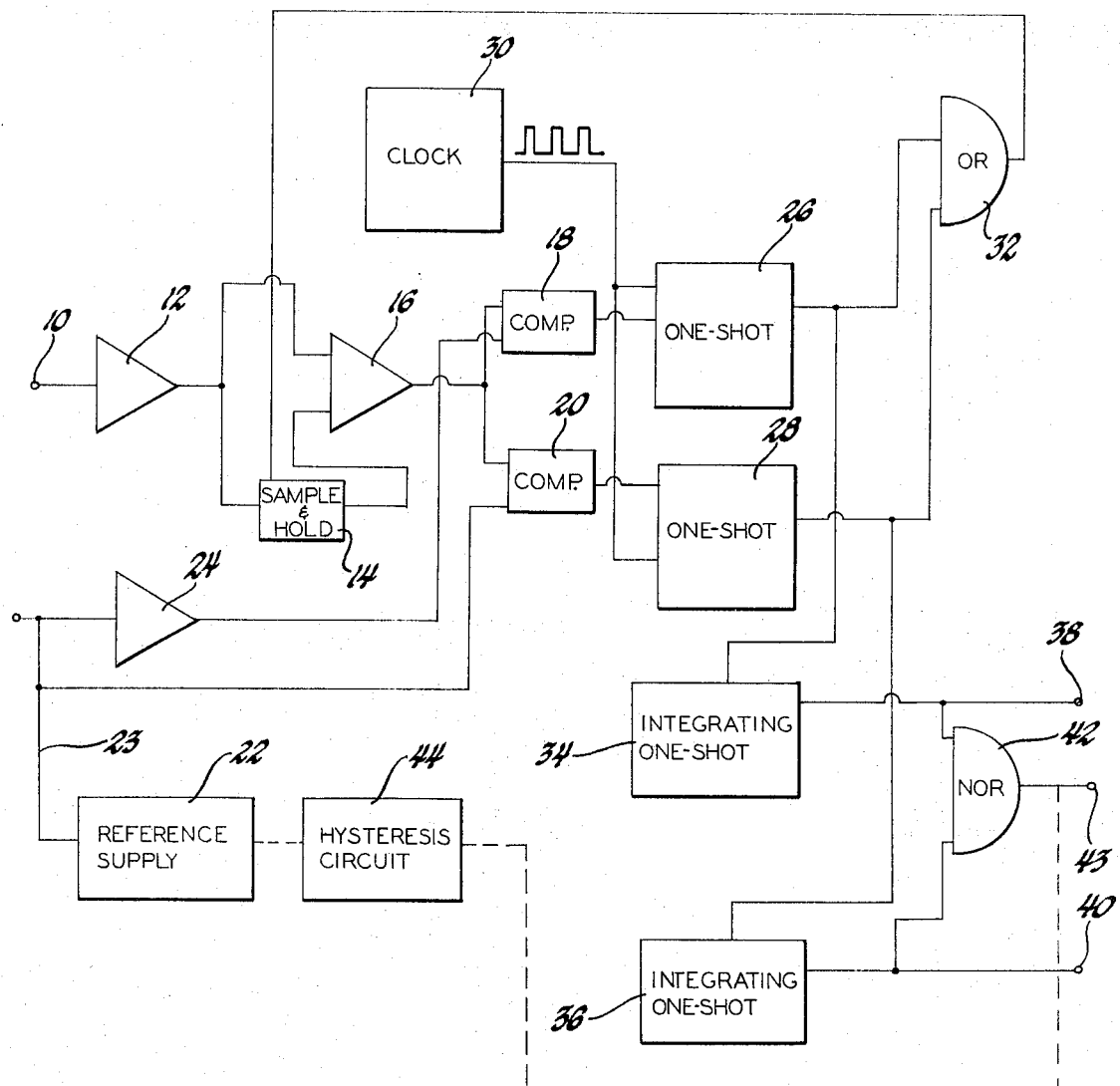

United States Patent [19]
Iadipaolo

[11] 3,784,921
[45] Jan. 8, 1974

[54] CIRCUIT INDICATING CHANGE AND STEADY STATE OF A DC SIGNAL

[75] Inventor: Rene M. Iadipaolo, Southfield, Mich.

[73] Assignee: General Motors Corporation, Detroit, Mich.

[22] Filed: Mar. 23, 1973

[21] Appl. No.: 344,071

[52] U.S. Cl............ 328/135, 307/235 R, 328/115, 328/146, 328/151
[51] Int. Cl.......................... H03k 5/20, H03k 5/153
[58] Field of Search.................... 307/235 R, 235 A; 328/59, 61, 62, 132, 135, 146, 147, 148, 149, 150, 151, 162, 163; 324/76 R, 77 R

[56] References Cited
UNITED STATES PATENTS

| | | | |
|---|---|---|---|
| 3,361,872 | 1/1968 | Sweeney | 328/146 X |
| 3,564,287 | 2/1971 | Todd | 328/151 X |
| 3,584,309 | 6/1971 | Nicolson | 328/151 X |
| 3,594,557 | 7/1971 | Anderson | 328/135 X |
| 3,599,105 | 8/1971 | Weir et al. | 328/151 X |
| 3,638,183 | 1/1972 | Prögler et al. | 307/235 X |
| 3,714,464 | 1/1973 | Nutt | 328/146 X |
| 3,717,818 | 2/1973 | Herbst | 307/235 R X |

Primary Examiner—John W. Huckert
Assistant Examiner—L. N. Anagnos
Attorney—Warren D. Hill et al.

[57] ABSTRACT

An input signal is applied to the subject circuit for determination of when the signal changes or reaches a steady state condition. Initially the input signal is stored in a sample and hold circuit and that stored value is compared with the input to determine when a preset difference has occurred. Then either of two one-shot multivibrators produces a short pulse depending on whether the difference is caused by positive or negative input change. The short pulse is used to reset the sample and hold circuit to the new value of the input signal and the same pulse is used to trigger either of two integrating one-shot multivibrators having long time constants providing long pulses indicative of positive or negative change. A gate responsive to the long pulses from both integrating multivibrators produces a steady state signal in the absence of both pulses.

3 Claims, 3 Drawing Figures

CIRCUIT INDICATING CHANGE AND STEADY STATE OF A DC SIGNAL

This invention relates to an electrical circuit for determing when a DC signal changes or reaches a steady state. It has been found to be useful when measuring a DC signal to provide a circuit for determining when the signal has reached a steady state so that the signal measurement will not be obfuscated by transients such as these which occur when a circuit is initially energized. Previous circuits which provide that information are generally characterized by a limited dynamic range, noise, and inaccuracy.

It is therefore a general object of this invention to provide a circuit for detecting a signal change and steady state having unlimited dynamic range, high stability, very low noise sensitivity and high accuracy.

A further object of this invention is to provide signal change and steady state detectors combining analogue and digital techniques.

This invention is carried out by an analogue circuit including a sample and hold circuit and a comparator circuit for sensing when a signal change of predetermined magnitude takes place, and a digital circuit responsive to such change for resetting the sample and hold circuit each time the predetermined signal change occurs, for providing a signal when a change takes place and for timing the period since the last sensed change to determine when a steady state condition has been reached.

Figure 2:
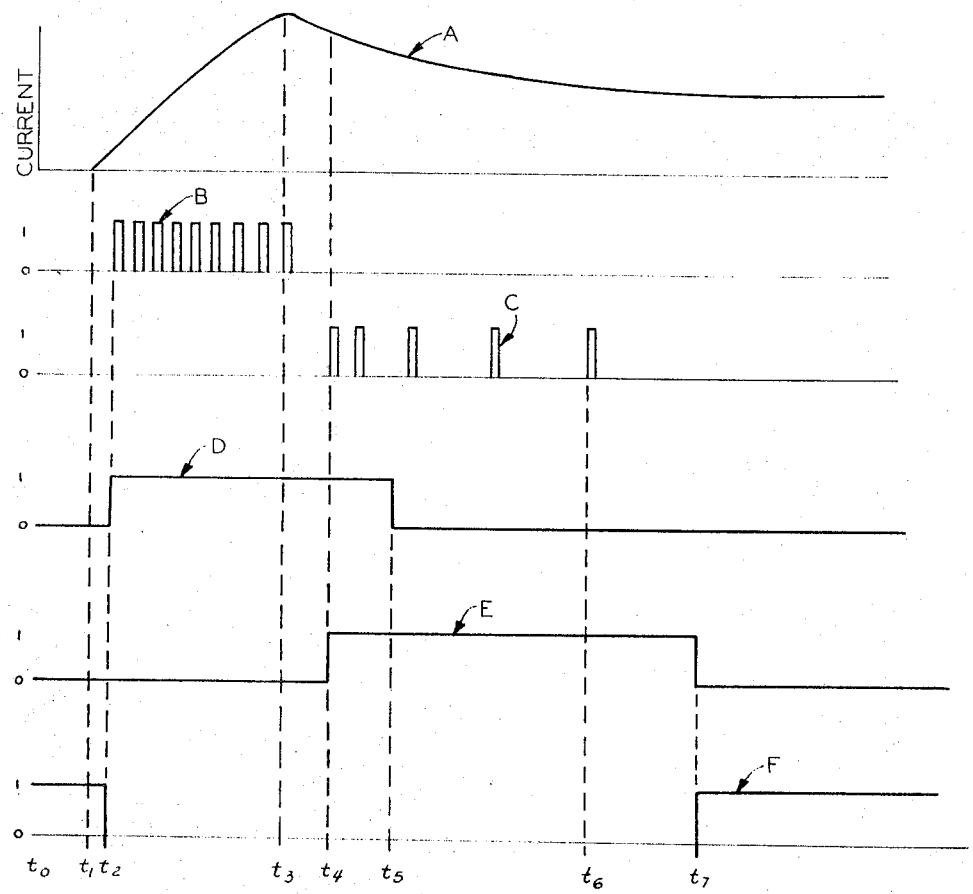
Figure 3:
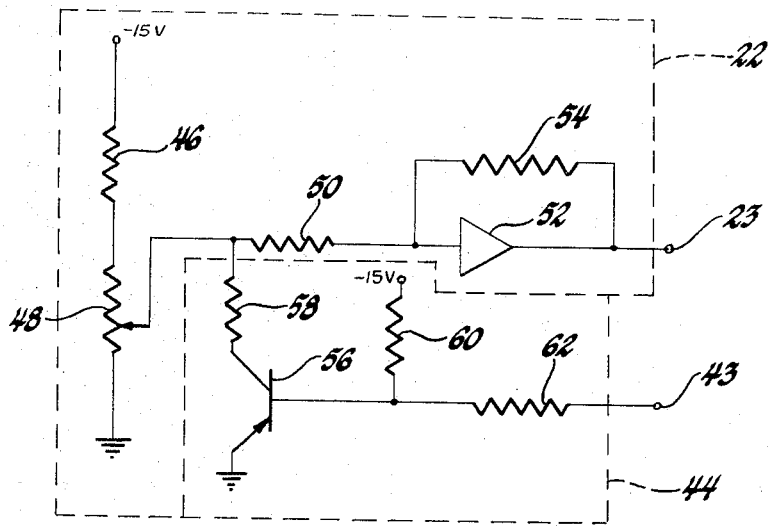

The above and other advantages will be made more apparent from the following specification taken in conjunction with the accompanying drawings wherein like reference numerals refer to like parts and wherein:

FIG. 1 is a block diagram of a circuit for detecting the change and steady state of an input signal according to the invention, FIG. 2 is a set of graphical representations of the signal processing operation of the circuit of FIG. 1, and FIG. 3 is a schematic diagram of the reference supply and hysteresis circuits of FIG. 1.

In a system for sequentially testing a number of circuit functions by a computer, such as measuring the current drawn by several different components of an automotive vehicle, several circuits are turned on and off serially according to a prearranged program. The current drawn from the vehicle battery by each individual circuit is monitored by a computer and compared to established standards in order to reveal defective circuits or electrical components. The invention described herein provides output signals to the computer for indicating when a current change occurs and when the current reaches a steady state in order to indicate to the computer that the circuit has been turned on as required and the earliest time that a steady state signal state is available for a measurement. A current measuring device associated with the battery is used as the input signal source for the testing of all the vehicle electrical systems.

Referring to FIG. 1 an input terminal 10 receiving the input signal corresponding to battery current is connected to an input amplifier 12 which is preset to scale the input signal to a convenient value for operation of the following circuit. Preferably the output signal of the amplifier 12 will span a range of from 0 to 10 volts. The amplifier 12 output is simultaneously fed to a long time decay sample and hold circuit 14 and to one input of differential amplifier 16. The output of the sample and hold circuit 14 is connected to a second input of the differential amplifier 16. The difference between the instantaneous value of the output amplifier 12 and the value stored by the sample and hold circuit 14 is determined by the differential amplifier 16. Thus the amplifier 16 has an output only when the input signal changes and this output is fed to a comparator circuit comprising two comparators 18 and 20. A reference power supply 22 produces a preset negative reference signal on line 23 which is connected to the comparator 20. The same reference signal is inverted by a unity gain amplifier 24 to produce a positive reference signal which is fed to the comparator 18. For the application described above, the two reference signals are preferably chosen to correspond to changes of battery current of 150 ma. When the difference signal from the amplifier 16 increases or decreases by an amount equivalent to the reference signals then the comparator 18 or 20 respectively will produce an output. The circuit as thus far described is analogue in nature and is sufficient to determine whether the input signal has changed by a predetermined amount since the sample and hold circuit 14 was last reset or updated, and to determine whether the change was positive or negative. The remaining circuitry is digital in nature.

The output of the comparator 18 is connected to an input of a one-shot multivibrator 26 while the comparator 20 is connected to a similar multivibrator 28, an output from either comparator will partially enable the corresponding multivibrator 26 or 28. A clock 30 producing positive going pulses at the rate of 1 kHz is connected to additional inputs of the multivibrators 26 and 28 to fully enable those multivibrators. When either multivibrator 26 or 28 (normally at a 0 logic level) is simultaneously enabled by signals from a comparator and the clock, it produces a 1 millisecond output pulse at a 1 logic level which is directed to an OR gate 32 having its output connected to a reset terminal of the sample and hold amplifier 14 so that the amplifier 14 then samples the current instantaneous value of the input signal represented by the output of the amplifier 12. At that point of course the inputs of the differential amplifiers 16 are equal so that its output becomes 0 and both comparators 18 and 20 are turned off. Then a new measurement cycle begins to monitor any continuing changes in the input signal. Thus the input signal itself controls the duration of each measurement cycle according to when signal changes reach the limits set on the comparator 18 and 20.

The output pulses from the one-shot multivibrators 26 and 28 are also fed to integrating one-shot multivibrators 34 and 36 respectively which produce 100 millisecond pulses at a 1 logic level when energized. Thus when the comparator 18 indicates a positive change of the input signal to energize multivibrator 26, the multivibrator 34 will also be energized to produce a relatively long output pulse indicative of a positive change of the input signal. This output pulse is fed to an output terminal 38. Similarly the multivibrator 36 is energized when a current decrease is sensed to provide an output at terminal 40 indicative of a negative change of the input signal. The outputs of the multivibrators 34 and 36 are also connected to the input terminals of a NOR gate 42 which produces an output signal at a 1 logic level of a terminal 43 in the absence of pulses from the multivibrators 34 and 36 which pulses indicate a change in the input signal. Thus when the input signal undergoes a positive or negative change of 150 ma, that change is indicated by a signal applied to the output terminal 38 or 40 respectively. The signals at those output terminals are sustained for as long as the 150 ma changes continue provided that the time period of 100 milliseconds established by the integrating one-shot multivibrators does not expire. However when that time period expires indicating no signal change of 150 ma has occurred, both multivibrators 34 and 36 will be at a 0 logic level state so that a 1 logic level steady state signal is applied at terminal 43.

The circuit operation is illustrated in FIG. 2 which graphically depicts the operation of the digital portion of the circuit. The graphs depict a typical input signal A, in terms of current plotted with respect to time while the remaining graph depicts the 0 or 1 logic state of the several logic elements. The waveforms B and C illustrate the output pulses of the one-shot multivibrators 26 and 28 respectively. Waveforms D and E depict the output pulses of the integrating one-shot multivibrators 34 and 36 respectively, while the waveform F depicts the steady state output of the NOR gate 42. At time $t_0$ the input voltage is zero and unchanging so the indicating waveforms D and E are at a 0 logic state and the steady state signal F is at a 1 logic state. At time $t_1$ the input signal begins to increase. At time $t_2$ the signal has increased by an amount equivalent to 150 ma as sensed by the comparator 18 so that the multivibrator 26 issues the first pulse in waveform B. At that time the multivibrator 34 is actuated to switch the waveform D to logic 1 state which in turn switches the steady state signal F to a 0 state. At the same time the sample and hold circuit is updated to the new value of the input signal, and thereafter whenever the input signal increases by 150 ma, another pulse in waveform B is generated to sustain the waveform D and again update the sample and hold circuit. When the input signal has essentially reached its peak at time $t_3$, the last pulse in the waveform B is generated. Due to the long decay time of the integrating one-shot multivibrator 34, the signal D will be sustained for 100 milliseconds and terminates at time $t_5$. Prior to that time however at $t_4$, the input signal A has changed in a negative sense by 150 ma as detected by the comparator 20 so that the multivibrator 28 is energized to produce a first pulse in the waveform C which is effective to energize the multivibrator 36 to change the waveform E to a logic 1 state thereby providing a signal at terminal 40 that a negative change has occurred. Since the waveforms D and E are overlapping the steady state signal F is unchanged. As the input signal A continues to decrease repeated pulses appear in waveform C but become more widely spaced as the input signal A changes less rapidly. By the time $t_6$, the last significant change occurs in the input signal A which is marked by the final pulse in the waveform C. At 100 milliseconds later, at time $t_7$, the time constant of the multivibrator 36 expires to reset the waveform E to a 0 logic state. Since both signals D and E are now in the 0 state, the signal F increases to a 1 logic state thereby indicating the steady state condition of the input signal. In use the subject circuit has proven to be very insensitive to noise and to have an unlimited dynamic range. The steady state accuracy is variable to 0.1 percent.

The accuracy of the subject apparatus may be further improved by incorporating a hysteresis circuit 44 connected to the terminal 43 for controlling the output voltage of the reference supply 22 according to the logic level of the steady state signal. By changing the reference signal to a smaller value when the input signal is not in a steady state position, smaller changes of the input signals are sensed so that the input signal must be even closer to a steady state value before the steady state signal is energized. For example, if the reference signals were made equivalent 50 ma, a change of less than 50 ma in a period of 100 microseconds would be considered to be a steady state condition. When steady state is achieved it is desirable to change the reference signal back to 150 ma to insure that noise does not trigger the system, that is, the signal to noise ratio is improved.

FIG. 3 schematically illustrates the hysteresis circuit 44 and the reference supply 22. The reference supply 22 includes a resistor 46 and a potentiometer 48 serially connected between a −15 volt supply and ground. The potentiometer center tap is connected through an input resistor 50 to an operational amplifier 52 having a feedback resistor 54. The circuit elements are scaled to provide an operational amplifier output on line 23 equivalent to 150 ma although that value is adjustable via the potentiometer 48. The hysteresis circuit 44 includes a transistor 56 having a grounded emitter and its collector connected through a resistor 58 to the center tap of the potentiometer 48. The transistor base is connected through a resistor 60 to a −15 volt source and through a resistor 62 to the steady state output terminal 43. When the input signal is not in steady state condition, the signal at terminal 43 is zero so that a negative voltage is applied through the resistor 60 to the base of the transistor 56 and the transistor conducts. This places the resistor 58 in series with the lower portion of the potentiometer 48 thereby reducing the potentiometer voltage and reducing the reference signal on line 23 to a value equivalent to, say, 50 ma change in the input signal. When however the input signal achieves a steady state, a positive voltage is applied to the terminal 43 which turns off the transistor 56 and allows the reference supply 22 to return to its normal output of 150 ma. Thus the hysteresis circuit is effective to increase the sensitivity of the signal change in the steady state detectors during non-steady state conditions to improve the accuracy of the steady state detection.

The embodiment of the invention described herein is for purposes of illustration and the scope of the invention is intended to be limited only by the following claims:

It is claimed:

1. A circuit for signalling a steady state condition and change of a DC input signal, comprising, a sample and hold circuit responsive to the input signal for storing a value of the input signal and producing a corresponding output signal, a circuit responsive to the input and the sample and hold output signals for determining the difference between those signals and producing a corresponding difference signal, comparator means responsive to the difference signal for producing an output when the difference signal exceeds preset limits, means responsive to the comparator output for updating the sample and hold circuits and for providing a pulse signal indicative that the input signal is in a state of change, and means responsive to the pulse signal for producing a steady state output signal a preset time period after the receipt of a pulse signal, including means for inhibiting the output signal upon the receipt of any additional pulse signal within the preset time period.

2. A circuit for signalling a steady state condition and change of a DC input signal, comprising, a sample and hold circuit responsive to the input signal for storing a value of the input signal and producing a corresponding output signal, a circuit responsive to the input and the sample and hold output signals for determining the difference between those signals and producing a corresponding difference signal, comparator means responsive to the difference signal for producing an output when the difference signal exceeds preset limits, means responsive to the comparator output for producing a short pulse indicative that the input signal is in a state of change, means responsive to the short pulse for updating the sample and hold circuit to the current value of the input signal, further means responsive to the short pulse for producing a long pulse having a preset nominal time period and for extending the long pulse upon the receipt of any additional short pulse within the present time period, the long pulse being indicative of change of the input signal beyond the preset limits, and means responsive to the long pulse for providing a steady state output signal in the absence of a long pulse indicating no substantial change in the input signal within the preset time period.

3. A circuit for signalling a steady state condition and change of a DC input signal, comprising, a sample and hold circuit responsive to the input signal for storing a value of the input signal and producing a corresponding output signal, a circuit responsive to the input and the sample and hold output signals for determining the difference between those signals and producing a corresponding difference signal, comparator means responsive to the difference signal for producing an output when the difference signal exceeds present limits, the comparator means including a first comparator circuit biased to a positive value for providing an output when the difference signal exceeds a position limit and a second comparator circuit biased to a negative value for providing an output when the difference signal exceeds a negative limit, first and second multivibrator circuits connected to the outputs of the first and second comparator circuits respectively for producing positive and negative input change signals, each multivibrator circuit comprising a one-shot multivibrator for producing a short pulse upon receipt of a comparator output and a serially connected integrating one-shot multivibrator for producing a long pulse of preset time period upon receipt of a said short pulse and for resetting the time period upon receipt of any additional short pulse, whereby the long pulse constitutes an input change signal, a means responsive to each short pulse for updating the sample and hold circuit to the current value of the input signal, and a gate responsive to the long pulse for producing a steady state output signal indicative of no change of the input signal beyond the preset comparator limits within the preset time period.

* * * * *